6909X
T. W. Harvey,
Making Wrought Nails,
Patented Jan. 24, 1832
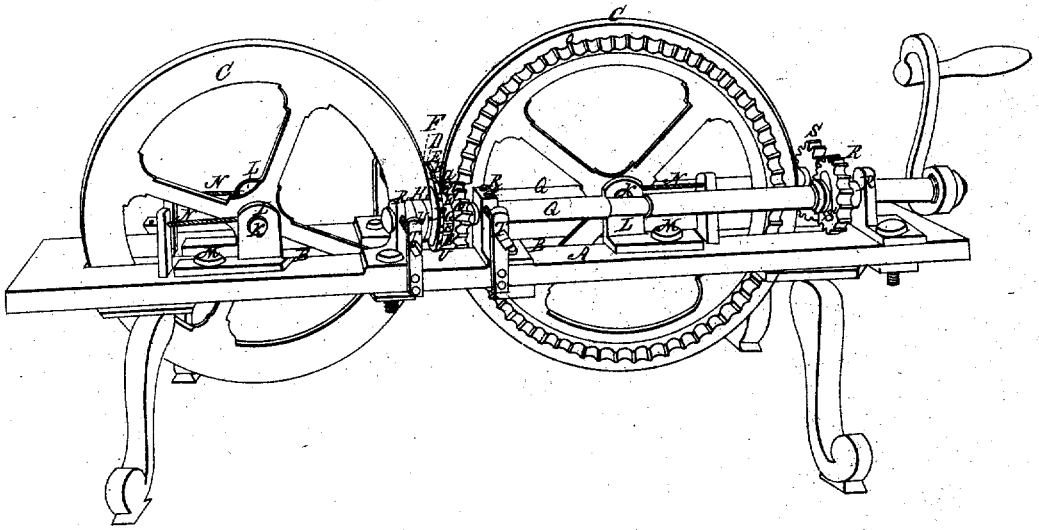
N. PETERS, PHOTO-LITHOGRAPHER, WASHINGTON, D. C.

Thomas W. Harvey
Letters Patent

The Schedule referred to in these Letters Patent and making part of the same containing a description in the words of the said Thomas W. Harvey himself of his Improvement in the Machine for making wrought Nails.

---

Be it known that I Thomas W. Harvey of Jamestown Chautauque County State of New York have made a new and useful improvement in the Machine for making wrought Nails which is described as follows. The Machine may be made wholly of cast and wrought iron and Steel, or the frame may be made of wood.

The frame marked A, in the annexed drawing is made about ten feet long, two feet wide, and two and a half feet high; having an opening B. left in the centre thereof, extending nearly its whole length to admit the rollers C.C. hereafter to be described. The swedging rollers or die plates D.D for swedging or rolling out the Nails, are made of steel ten inches in diameter, and as thick as the required nail. The circumference of each of said swedging rollers or die plates, is divided into ten or more or less equal parts, according to the length of the nails to be rolled or swedged, and each division on the periphery of the swedging roller or die plate, and the corresponding one on the opposite roller or plate are to be filed away and shaped, or indented, in such a manner, that when they come together during the revolution of the swedging rollers or die plates, they will form the spaces or cavities exactly the shape of the nail to be rolled or swedged therein; and there are also the same number of chisels E.E.E. as there are divisions, dovetailed into the peripheries of the swedging rollers or die plates to cut the nails from the rod as fast as rolled; said chisels coming together with their edges, as the swedging rollers or die plates revolve. The swedging rollers or die plates D.D. are secured firmly on the ends of the axles. Q.Q. hereafter to be described, by collars F.F. and G.G. having screws H.H.H, passing the collars F.F. and the swedging rollers or die plates D.D. into the fixed collars G.G. the collars F.F. being moveable, these collars besides keeping the swedging rollers or die plates firm and true in a vertical position serve also to secure the

6909X the chisels. The swedging rollers or die plates are placed across the centre of
the frame and revolve in a vertical position opposite and against each other
as shown in the drawing) Side Rollers_ on the sides of the swedging rollers
or die plates and where their peripheries meet are placed two rollers C, C, at
right angles to them revolving also in a vertical position with their periphe-
ries nearly in contact leaving just space enough to form the sides of the Nail.
The swedging rollers or die plates forming the edges & head as before described. These
rollers are [illegible] feet in diameter, the peripheries of which are of cast or wrought
iron or steel and may be plain or indented. They are supported and turn
on axles K.K. in the heads of standards L.L. secured to the frame by screw bolts
M.M. and are brought nearer to or farther from each other as occasion may re-
quire, by the tempering screws N.N. bearing against the edges of the stand-
ards L.L. on the side of one the rollers C. is formed a cylindrical row of cogs or
rack O. into which the pinion P. 10 inches in diameter placed on the end
of axle Q. mashes, and by which the rollers C.C. are turned.
Axles and cog wheels. On each side of the frame and parallel with each
other are placed two axles Q.Q. supported and turning with their bearings
or journals in openings in the heads of standards R,R,R,R. On the ends of
said axles, over the centre of the frame, are placed the swedging rollers or die
plates as before described, and at the other ends are secured the cog wheels
S.S. ten and a half inches in diameter mashing into each other. The stand-
ards are all regulated by tempering screws; those of the centre of the frame by
the screws T.T. operating on the swedging rollers or die plates. U.U. are cav-
ities in the top of the frame containing water, in which the outer edges of
the swedging rollers or die plates revolve, to prevent their becoming heated.
The machine is operated by steam, manual or any known power appli-
ed to the shaft Q, on which is represented a crank in the drawing. The
rods of iron from which the nails are swedged or rolled are slit of a proper
size and heated, then passed perpendicularly through an iron tube or guide
erected above the machine between the swedging rollers or die plates and
there swedged rolled or formed into nails of any shape required.
The proportions and dimensions of the several parts of the before described ma-
chine may be varied to suit the different kinds and sizes of nails required, the 6409X [illegible]

the proportions of the side rollers may also be varied.

What I particularly claim as my improvement in the before described machine for making wrought nails are the side rollers C,C, and the general arrangement of the gearing. I make no claim to the swaging rollers or die plates.

In testimony that the foregoing is a true description of my said improvement, I have hereunto subscribed my name before two witnesses this 21st day of January 1832.

Witnesses
William G. Cranch
William P. Elliot

Thomas W. Harvey

[illegible]